United States Patent
Dujmovic et al.

(10) Patent No.: US 9,336,208 B2
(45) Date of Patent: May 10, 2016

(54) SYNCHRONIZATION OF CONFIGURATION CHANGES BETWEEN APPLICATIONS AND THEIR PLATFORMS

(71) Applicant: Oracle International Corporation, Redwood Shores, CA (US)

(72) Inventors: Ivo Dujmovic, Redwood City, CA (US); Satya Prakash Bandla, Andhra Pradesh (IN); Ulhas Murlidhar Pinjarkar, Andhra Pradesh (IN); Ramya Damodaran, Andhra Pradesh (IN)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 0 days.

(21) Appl. No.: 13/802,794

(22) Filed: Mar. 14, 2013

(65) Prior Publication Data

US 2014/0189671 A1 Jul. 3, 2014

Related U.S. Application Data

(60) Provisional application No. 61/707,823, filed on Sep. 28, 2012, provisional application No. 61/707,827, filed on Sep. 28, 2012, provisional application No. 61/707,840, filed on Sep. 28, 2012.

(51) Int. Cl.
| | |
|---|---|
| G06F 9/445 | (2006.01) |
| G06F 17/30 | (2006.01) |
| G06F 9/44 | (2006.01) |

(52) U.S. Cl.
CPC ............ *G06F 17/30002* (2013.01); *G06F 8/65* (2013.01); *G06F 8/67* (2013.01);

(Continued)

(58) Field of Classification Search
None
See application file for complete search history.

(56) References Cited

U.S. PATENT DOCUMENTS

| | | |
|---|---|---|
| 5,227,967 A | 7/1993 | Bailey |
| 5,315,709 A | 5/1994 | Alston et al. |

(Continued)

OTHER PUBLICATIONS

Lassen et al. Experiences with object oriented development in PL!SQL, Center for Object Technology COT/4-18-V1.4, 2000.

(Continued)

*Primary Examiner* — Lewis A Bullock, Jr.
*Assistant Examiner* — Wynuel Aquino
(74) *Attorney, Agent, or Firm* — Vista IP Law Group, LLP

(57) ABSTRACT

A method, system, and computer program product for handling synchronization of configuration changes between applications and their platforms. A computer implemented method synchronizes middleware configurations with application configurations using a reciprocating protocol. The protocol includes receiving a middleware state variable from a middleware component, then processing the middleware state variable to determine any application configuration state variables that depend on a value of the middleware state variable. The application (or agent) further processes the application configuration state variable to determine any affected middleware state variables and then sends the affected middleware state variable to the middleware component. The determinations can be performed using a forward mapper or reverse mapper, and the determinations can reciprocate repeatedly between applications and their middleware platforms until quiescence. The techniques can be used during an online patch cycle to maintain synchronization of configuration changes between applications and their platforms even while components are being patched.

19 Claims, 9 Drawing Sheets

(52) U.S. Cl.
CPC ........... *G06F 8/68* (2013.01); *G06F 17/30174* (2013.01); *G06F 17/30374* (2013.01); *G06F 17/30383* (2013.01); *G06F 17/30424* (2013.01); *G06F 17/30595* (2013.01)

(56) References Cited

U.S. PATENT DOCUMENTS

| | | | |
|---|---|---|---|
| 5,440,743 | A | 8/1995 | Yokota et al. |
| 5,448,727 | A | 9/1995 | Annevelink |
| 5,555,388 | A | 9/1996 | Shaughnessy |
| 5,608,903 | A | 3/1997 | Prasad et al. |
| 5,640,550 | A | 6/1997 | Coker |
| 5,717,924 | A | 2/1998 | Kawai |
| 5,978,426 | A | 11/1999 | Glover et al. |
| 6,016,497 | A | 1/2000 | Suver |
| 6,122,630 | A | 9/2000 | Strickler et al. |
| 6,122,640 | A | 9/2000 | Pereira |
| 6,138,112 | A | 10/2000 | Slutz |
| 6,173,313 | B1 | 1/2001 | Klots et al. |
| 6,268,850 | B1 | 7/2001 | Ng |
| 6,304,867 | B1 | 10/2001 | Schmidt |
| 6,324,535 | B1 | 11/2001 | Bair et al. |
| 6,363,387 | B1 | 3/2002 | Ponnekanti et al. |
| 6,460,055 | B1 | 10/2002 | Midgley et al. |
| 6,480,848 | B1 | 11/2002 | DeKimpe et al. |
| 6,519,613 | B1 | 2/2003 | Friske et al. |
| 6,598,059 | B1 | 7/2003 | Vasudevan et al. |
| 6,611,848 | B1 | 8/2003 | Bradley |
| 6,633,870 | B1 | 10/2003 | Bradley |
| 6,633,883 | B2 | 10/2003 | Koskas |
| 6,681,225 | B1 | 1/2004 | Uceda-Sosa et al. |
| 6,745,209 | B2 | 6/2004 | Holenstein et al. |
| 6,769,124 | B1 | 7/2004 | Schoening et al. |
| 6,801,983 | B2 | 10/2004 | Abe et al. |
| 6,834,290 | B1 | 12/2004 | Pugh et al. |
| 6,965,899 | B1 | 11/2005 | Subramaniam et al. |
| 7,028,057 | B1 | 4/2006 | Vasudevan et al. |
| 7,080,371 | B1 | 7/2006 | Arnaiz et al. |
| 7,237,238 | B2 | 6/2007 | Peppers |
| 7,310,653 | B2 | 12/2007 | Coyle et al. |
| 7,350,191 | B1 | 3/2008 | Kompella et al. |
| 7,421,458 | B1 | 9/2008 | Taylor et al. |
| 7,574,461 | B1 | 8/2009 | Armorer et al. |
| 7,603,669 | B2 | 10/2009 | Curtis et al. |
| 7,689,587 | B1 | 3/2010 | Tiruveedi et al. |
| 7,693,889 | B1 | 4/2010 | Armorer et al. |
| 8,087,013 | B2 * | 12/2011 | Kelly et al. .................... 717/168 |
| 8,495,612 | B2 | 7/2013 | Bertrand |
| 8,793,230 | B2 | 7/2014 | Engelko et al. |
| 9,043,778 | B2 | 5/2015 | Lin et al. |
| 2002/0019972 | A1 | 2/2002 | Grier et al. |
| 2002/0087271 | A1 | 7/2002 | Rozenshtein et al. |
| 2002/0188600 | A1 | 12/2002 | Lindsay et al. |
| 2003/0041127 | A1 | 2/2003 | Turnbull |
| 2003/0154216 | A1 | 8/2003 | Arnold et al. |
| 2003/0217069 | A1 | 11/2003 | Fagin et al. |
| 2003/0229610 | A1 | 12/2003 | Van Treeck |
| 2004/0064487 | A1 | 4/2004 | Nguyen et al. |
| 2005/0015376 | A1 | 1/2005 | Fraser et al. |
| 2005/0108733 | A1 * | 5/2005 | Bermudez et al. ............ 719/328 |
| 2005/0149475 | A1 | 7/2005 | Chkodrov et al. |
| 2005/0149920 | A1 | 7/2005 | Patrizi et al. |
| 2005/0154695 | A1 | 7/2005 | Gonzalez et al. |
| 2006/0015528 | A1 | 1/2006 | Hejlsberg et al. |
| 2006/0085457 | A1 | 4/2006 | Gelfand |
| 2006/0085465 | A1 | 4/2006 | Nori et al. |
| 2006/0117029 | A1 | 6/2006 | Yingst |
| 2006/0130040 | A1 | 6/2006 | Subramanian et al. |
| 2006/0242381 | A1 | 10/2006 | Shatskih et al. |
| 2007/0038590 | A1 | 2/2007 | Vijayan et al. |
| 2007/0038651 | A1 | 2/2007 | Bernstein et al. |
| 2007/0061487 | A1 | 3/2007 | Moore |
| 2007/0079140 | A1 | 4/2007 | Metzger et al. |
| 2007/0106701 | A1 | 5/2007 | Periyasamy |
| 2007/0156849 | A1 | 7/2007 | Becker |
| 2007/0219951 | A1 | 9/2007 | Ahmed et al. |
| 2008/0098046 | A1 | 4/2008 | Alpern |
| 2008/0201701 | A1 | 8/2008 | Hofhansl et al. |
| 2008/0243966 | A1 | 10/2008 | Croisettier |
| 2009/0006884 | A1 | 1/2009 | Cahill |
| 2010/0110474 | A1 | 5/2010 | Coulter et al. |
| 2010/0281458 | A1 | 11/2010 | Paladino |
| 2012/0222025 | A1 * | 8/2012 | Pandit .......................... 717/170 |
| 2013/0104115 | A1 | 4/2013 | Bertrand |
| 2013/0132936 | A1 | 5/2013 | Wang |
| 2014/0344798 | A1 | 11/2014 | Sasaki |

OTHER PUBLICATIONS

Object Cache Navigation, Oracle Call Interface PRogrammer's Guide, Release 2 (9.2), Part No. A96584-10, 1996,2002.

Datc et al, A Guide to SQL/DS, 1989, Addison-Wesley, Chapter 10.

Quest Software, Inc., LiveReorg.RTM., "Reorganization for the 24.times.7, Database," 2001.

Paapanen, Eric et al., "Oracle Database Application Developer's Guide-Large Objects", 10g Release 1 (10.1), Part No. B1079601, Apr. 21, 2008, 668 pages.

Smith, Jeff, "The Shortest, Fastest, and Easiest way to compare two tables in SQL Server: Union!", Jeff's SQL Server Blog 10, Apr. 22, 2008, 45 pages.

T-SQL, "sp_rename (T-SQL)", printed Apr. 22, 2008, 3 pages.

Non-final Office Action dated Mar. 8, 2010 for U.S. Appl. No. 11/875,478.

Advisory Action dated Jan. 26, 2010 for U.S. Appl. No. 11/444,571.

Davidson, Tom, "Managing Schema Changes (Part 2),"MSSQL Server Development Customer Advisory Team, Mar. 31, 2006, Microsoft Cororation. Nov. 19, 2000 <http://blogs.msdn.com/sqlcat/archive/2006/O3/31/566046.aspx>.

Ambler, Scott, and Pramod Sadalage. Refactoring Databases: Evolutionary Database Design. Mar. 3, 2006.

Final Office Action dated Aug. 30, 2010 for U.S. Appl. No. 11/875,478.

Notice of Allowance dated Mar. 21, 2011 for U.S. Appl. No. 11/444,571.

Final Office Action dated Dec. 7, 2010 for U.S. Appl. No. 11/201,797.

Final Office Action dated Sep. 8, 2011 for U.S. Appl. No. 11/801,495.

Scott Ambler et al., "Refactoring Databases: Evolutionary Database Design", Mar. 3, 2006, 7 pages.

Tom Davidson, Managing Schema Changes (Part 2), MSSQL Server Development Customer Advisory Teach, Mar. 31, 2006, Microsoft Corporation, Nov. 19, 2000, http://blgs.msdn.com/squlcat/archive/2006/03/31/566046.aspx, 11 pages.

Non-final Office Action dated Jan. 31, 2012 for U.S. Appl. No. 11/875,478.

Final Office Action dated Jan. 25, 2012 for U.S. Appl. No. 11/201,797.

Non-final Office Action dated Jun. 27, 2012 for U.S. Appl. No. 11/875,478.

Final Office Action dated Jan. 29, 2013 for U.S. Appl. No. 11/875,478.

Advisory Action dated Mar. 8, 2013 for U.S. Appl. No. 11/875,478.

Final Office Action dated Mar. 29, 2013 for U.S. Appl. No. 11/801,495.

Notice of Allowance dated Jun. 12, 2013 for U.S. Appl. No. 11/875,478.

Notice of Allowance dated Jan. 16, 2015 for U.S. Appl. No. 13/802,780.

Non-final Office Action dated Nov. 20, 2014 for U.S. Appl. No. 13/802,785.

"Oracle OLAP", Oracle, Jan. 3, 2012, 2 pages url: http://www.oracle.com/technetwork/database/options/olap/index.html.

"Introduction to Analytic Workspaces", Oracle OLAP DML Reference, 11g Release 1 (11.1), Part No. B28126-03, Oracle, Mar. 18, 2013, 2 pages url: http://docs.oracle.com/cd/B28359_01/olap.111/b28126/dml_basics004.htm.

Non-final Office Action dated Feb. 12, 2015 for U.S. Appl. No. 13/802,774.

(56) References Cited

OTHER PUBLICATIONS

Alan Choi, "Online Application Upgrade Using Edition-Based Redefinition", 2009, ACM.
Non-final Office Action dated Feb. 12, 2015 for U.S. Appl. No. 13/802,791.
Non-final Office Action dated Mar. 27, 2015 for U.S. Appl. No. 13/802,771.
Final Office Action dated Jun. 1, 2015 for U.S. Appl. No. 13/802,785.
Final Office Action dated Jul. 8, 2015 for U.S. Appl. No. 13/802,774.
Final Office Action dated Jul. 14, 2015 for U.S. Appl. No. 13/802,791.
Notice of Alowance dated May 11, 2015 for U.S. Appl. No. 13/802,780.
Notice of Allowance and Fees Due dated Oct. 21, 2015 for related U.S. Appl. No. 13/802,785.
Final Office Action dated Oct. 23, 2015 for related U.S. Appl. No. 13/802,771.
Notice of Allowance and Fees Due dated Nov. 25, 2015 for related U.S. Appl. No. 13/802,774.
Non-final Office Action dated Dec. 2, 2015 for related U.S. Appl. No. 13/802,791.

\* cited by examiner

SYNCHRONIZATION OF CONFIGURATION CHANGES BETWEEN APPLICATIONS AND THEIR PLATFORMS

RELATED APPLICATIONS

The present application claims the benefit of priority to U.S. Provisional Patent Application Ser. No. 61/707,823, entitled "ONLINE PATCHING ORCHESTRATION", filed on Sep. 28, 2012, and U.S. Provisional Patent Application Ser. No. 61/707,827, entitled "CONFIGURATION CHANGE DETECTION AND PROPAGATION", filed on Sep. 28, 2012, and U.S. Provisional Patent Application Ser. No. 61/707,840, entitled "SYNCHRONIZING DOMAIN CONFIGURATION PARAMETERS", filed on Sep. 28, 2012, which are all hereby incorporated by reference in their entireties; and the present application is related to co-pending U.S. patent application Ser. No. 13/802,771, entitled "USING A DATA DICTIONARY TO DETERMINE AN UPGRADE EDITION OF A RELATIONAL DATABASE TABLE", filed on even date herewith, which is hereby incorporated by reference in its entirety; and the present application is related to co-pending U.S. patent application Ser. No. 13/802,774, entitled "ONLINE UPGRADING OF A DATABASE ENVIRONMENT USING TRANSPARENTLY-PATCHED SEED DATA TABLES", filed on even date herewith, which is hereby incorporated by reference in its entirety; and the present application is related to co-pending U.S. patent application Ser. No. 13/802,780, entitled "TRANSPARENTLY UPGRADING DERIVED DATABASE OBJECTS", filed on even date herewith, which is hereby incorporated by reference in its entirety; and the present application is related to co-pending U.S. patent application Ser. No. 13/802,785, entitled "USING CONFIDENCE VALUES FOR SYNCHRONIZING FILE SYSTEMS", filed on even date herewith, which is hereby incorporated by reference in its entirety; and the present application is related to co-pending U.S. patent application Ser. No. 13/802,791, entitled "REDUCING DOWNTIME DURING UPGRADES OF INTERRELATED COMPONENTS IN A DATABASE SYSTEM", filed on even date herewith, which is hereby incorporated by reference in its entirety.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD

The disclosure relates to the field of maintaining software installations and more particularly to techniques for synchronizing between middleware configurations and application configurations.

BACKGROUND

Legacy techniques for upgrading a software application to a new version have traditionally been accomplished by overwriting the old software module (e.g., prior version of code) with a new software module (e.g., new version of code). Other legacy techniques have included steps to capture the configuration parameters corresponding to the old application and applying those parameters to the new software module. Various techniques for applying those parameters to the new software module have been employed, for example, storing the configuration parameter in a file, and pointing the new software module to the configuration parameter file. Other techniques have applied the configuration parameters to the new software module by patching the configuration parameters into the new software module. Such techniques have become deficient with the advent of middleware. For example, middleware might be used as a services platform that is common to a large set of applications, and some portion of the middleware might be tuned or configured to handle particular application services in a particular manner depending on the application. Thus, an upgrade by merely replacing an old application software module with a new application software module might not take into account configuration changes made to the middleware in order to tune or configure the services as intended to be used by the new application software module.

Worse, at least since the advent of middleware, it becomes apparent that in the context of typical application installations, there are many more and frequent configuration state changes than there are application code module upgrades. The lifecycle of an application software module in an installation might be reasonably expressed in months, yet the configuration parameters in that same installation might be reasonably expressed in years. The foregoing observations, coupled with the cost of performing upgrades motivates the need for performing upgrades of an installation where upgrades of the software application modules in an installation can be performed independently from upgrades or changes of the configuration parameters (e.g., software application configuration parameters or middleware configuration changes).

The aforementioned technologies do not have the capabilities to perform synchronizing between middleware configurations and application configurations, and the aforementioned technologies do not address synchronizing between middleware configurations and application configurations in the context of an installation-wide upgrade (e.g., involving multiple applications to be concurrently upgraded). Therefore, there is a need for an improved approach.

SUMMARY

The present disclosure provides an improved method, system, and computer program product suited to address the aforementioned issues with legacy approaches. More specifically, the present disclosure provides a detailed description of techniques used in methods, systems, and computer program products for synchronizing between middleware configurations and application configurations.

A computer implemented method synchronizes middleware configurations with application configurations using a reciprocating protocol in conjunction with mapping and transformation operations. The protocol includes receiving a middleware state variable from a middleware component, then processing the middleware state variable to determine any application configuration state variables that depend on a value of the middleware state variable. The application (or agent) further processes the application configuration state variable to determine any affected middleware state variables and then sends the affected middleware state variable to the middleware component (e.g., by name, or by value and name, etc.). The determinations can be performed using a forward mapper or reverse mapper, and the determinations can reciprocate repeatedly between applications and their middleware platforms until quiescence. The techniques can be used during an online patch cycle to maintain synchronization of configuration changes between applications and their platforms even while components are being patched.

Further details of aspects, objectives, and advantages of the disclosure are described below in the detailed description, drawings, and claims. Both the foregoing general description of the background and the following detailed description are exemplary and explanatory, and are not intended to be limiting as to the scope of the claims.

DETAILED DESCRIPTION

Some embodiments of the present disclosure are directed to an improved approach for synchronizing between middleware configurations and application configurations. More particularly, disclosed herein are exemplary environments, methods, and systems for synchronizing between middleware configurations and application configurations.

Overview

Described herein-below and in the accompanying figures are scalable methods and apparatus for implementing synchronizing between middleware configurations and application configurations.

The deployment of middleware (e.g., an application server or a domain server) in an enterprise serves to lower the cost of operations, improve organizational performance, enhance scalability, and provide a foundation for database applications.

As the deployment of middleware as a platform for application services expands, so expands the requirement for the middleware to evolve in synchronicity with the applications it serves. Strictly as one example is the rapid adoption of middleware components in enterprise installations. Another example is the rapid adoption of middleware to service communications with mobile terminal devices (e.g., smart phones).

Figure 1:
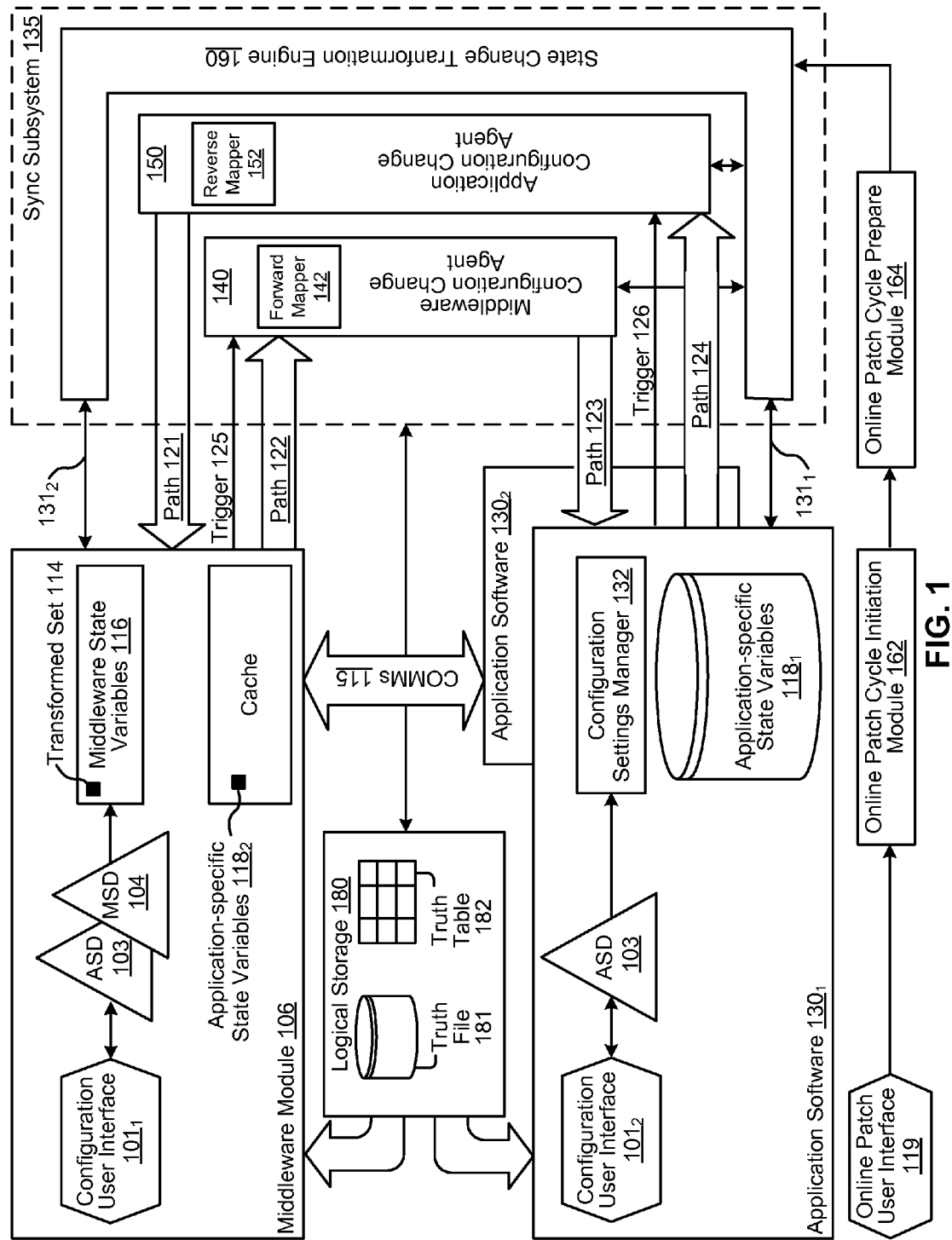
FIG. 1 is a block diagram of an installation in which are performed operations for synchronizing between middleware configurations and application configurations, according to some embodiments.

In enterprise installations, the lifecycle of middle ware often evolves under a separate and distinct regime as compared to the lifecycle of applications deployed on it. Over time, best practices for minimizing system changes at any maintenance event have emerged, and some best practices encourage administrators to apply changes sequentially (rather than in parallel), and thus, system administrators often elect to change either code or configuration (but not both) in only one of the middleware or the application. In an exemplary installation, specifically an installation comprising a database engine and a plurality of software applications, improvements to the middleware are needed in order to keep pace with the improvements to the software applications that use the middleware, yet some configuration parameters may have been established in an earlier timeframe in the installation lifecycle, and may need to persist through many upgrade cycles. FIG. 1 depicts such an exemplary installation.

Definitions

Some of the terms used in this description are defined below for easy reference. The presented terms and their respective definitions are not rigidly restricted to these definitions—a term may be further defined by the term's use within this disclosure.

- The term or acronym "API" refers to an application programming interface.
- The term "logic" means any combination of software or hardware that is used to implement all or part of the embodiments of the present disclosure.
- The term "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.
- As used in this application and the appended claims, the term "or" is intended to mean an inclusive "or" rather than an exclusive "or". That is, unless specified otherwise, or is clear from the context, "X employs A or B" is intended to mean any of the natural inclusive permutations. That is, if X employs A, X employs B, or X employs both A and B, then "X employs A or B" is satisfied under any of the foregoing instances.
- The articles "a" and "an" as used in this application and the appended claims should generally be construed to mean "one or more" unless specified otherwise or is clear from the context to be directed to a singular form.

Reference is now made in detail to certain embodiments. The disclosed embodiments are not intended to be limiting of the claims.

Descriptions of Exemplary Embodiments

FIG. 1 is a block diagram of an installation 100 in which are performed operations for synchronizing between middleware configurations and application configurations. As an option, the present installation 100 may be implemented in the context of the architecture and functionality of the embodiments described herein. Also, the installation 100 or any aspect therein may be implemented in any desired environment.

As shown, the installation comprises software applications (e.g., application software $130_1$, application software $130_2$, etc.) any one or more of which enterprise software applications are in communication with one or more instances of a middleware module 106 using any forms of known-in-the-art communication techniques (see COMMS 115). Strictly as examples, such communication techniques covers intra- and inter-process communication, and covers cases involving application code running in the context of and/or using code of, the middleware platform. Another example is application code running within in a Java Virtual Machine (JVM), which in turn is executing middleware code. The middleware module might serve as an application server component, or as an HTTP server component, or may provide any sorts of services to the enterprise software applications. In addition to comprising code to perform the operations of the application, an enterprise software application comprises at least one component of a configuration settings manager which configuration settings manager may be included within a running application (e.g., configuration settings manager 132 as shown), or, a configuration settings manager 132 may be implemented in any environment. Further, any component of a configuration settings manager might be subsumed into an enterprise software application (as shown), or it might be implemented as a stand-alone application. An enterprise software application might comprise an API component to provide support for communications with the stand-alone configuration settings manager.

Regardless of any specific implementation choice for the embodiments of a configuration settings manager, a user can use one or more configuration user interfaces (e.g., configuration user interface $101_1$, configuration user interface $101_2$, etc.) to view and change the configuration states as used in the installation. For example, a user might use an instance of configuration user interface $101_1$ to view and change configuration states corresponding the middleware state variables 116. Or, a user might use an instance of a configuration user interface $101_2$ to view and change configuration states corresponding to an enterprise software application. Any instance of a configuration user interface might use a configuration state data element in the form of a configuration data description object (e.g., middleware state description MSD 104, application state description ASD 103). Such a configuration state data element might be in the form of an XML schema or DTD, or such a configuration state data element might be in the form of a text file or relational database structure, etc. that describes the type and format of state variables. Middleware state variables 116 are maintained in a manner accessible by the middleware modules. Similarly, application-specific state variables (e.g., application-specific state variables $118_1$, or application-specific state variables $118_2$) are maintained in any manner accessible by (1) the enterprise software applications and (2) their respective middleware modules. In some cases (as shown), application-specific state variables $118_2$ or a portion thereof are maintained in a manner accessible by middleware modules, possibly using a cache.

As is heretofore indicated, there is a need to change the configuration of software application modules in a manner that is independent from the manner of making changes to the middleware configuration. However, in exemplary installations, and as shown, a change to the configuration of a middleware component might impact the operation of a software application being serviced by the middleware. And, a change to the configuration of a software application might impact the operation of middleware that is servicing the software application.

In the configuration shown, a change to the configuration of a middleware component can trigger operations (e.g., using notification trigger 125) within a sync subsystem 135. For example, a change to the configuration of a middleware component can trigger operations within a middleware configuration change agent 140, and the middleware configuration change agent might in turn execute a pull operation to pull state information from the middleware module (see pull path 122). Also, in the configuration shown, a change to the configuration of a software application can trigger operations within a sync subsystem 135. For example, a change to the configuration of a software application can push configuration changes to an application configuration change agent 150 (see application push path 124).

Again referring to the configuration shown in FIG. 1, one operation within a middleware configuration change agent 140 might be to advise one or more instances of application software of the change (or of the nature of the change) of the middleware configuration. To do so might involve a forward mapper 142. A forward mapper serves to accept a changed middleware state parameter and determine what applications should receive a push (see forward push path 123) of the changed middleware state parameter. Or, a forward mapper serves to accept a changed middleware state parameter and determine what application configuration settings might be affected. For example, an HTTP middleware component might be re-configured to serve a particular protocol (e.g., HTTPS), and underlying applications might need to know of this change. Following the foregoing, an underlying application would receive a push (see forward push path 123) of the re-configured middleware state parameter set to serve a particular dialect of HTML. In some cases a forward mapper can access any one or more configuration data description objects (e.g., middleware state description MSD 104, application state description ASD 103), and can use the type and format descriptions of state variables to make the foregoing determinations.

Strictly as another example a forward push path would be exercised upon adding new middleware modules (e.g., managed server instances) to the overall mix of middleware modules that serve the application software. Furthering this example, the application code would need to be informed (e.g., by the middleware) of a topology change, and might need to respond by modifying various application-owned configuration aspects (e.g., to match security setting to the changed topology).

In a reverse sense, a change in the configuration settings of an instance of application software 130 may need to be reflected in one or more middleware components. Accordingly, an application configuration change agent 150 may use a reverse mapper 152 to map from an application configuration setting to one or more changes in the middleware state variables 116. In some cases a reverse mapper 152 can access any one or more configuration data description objects (e.g., middleware state description MSD 104, application state description ASD 103), and can use the type and format descriptions of state variables to make the foregoing determination.

Strictly as another example, changing the JVM startup parameters pertaining to the JVM upon which an application runs would need to be propagated to a middleware configuration (e.g. since JVMs might need to be added, and scaled up or scaled out.

Ongoing use of the sync subsystem 135 can serve to keep application configurations in synch with corresponding middleware configurations. Using the sync subsystem 135 as heretofore described serves to facilitate frequent upgrades of an application software module while retaining the overall configuration of the installation. Furthermore, and is more fully described in the following, substantially all of the constituent software components of an installation can be subjected to an installation-wide upgrade while minimizing down-time. Use of an online patching cycle and use of multiple editions (e.g., a run edition and a patch edition) are now briefly described.

Figure 2:
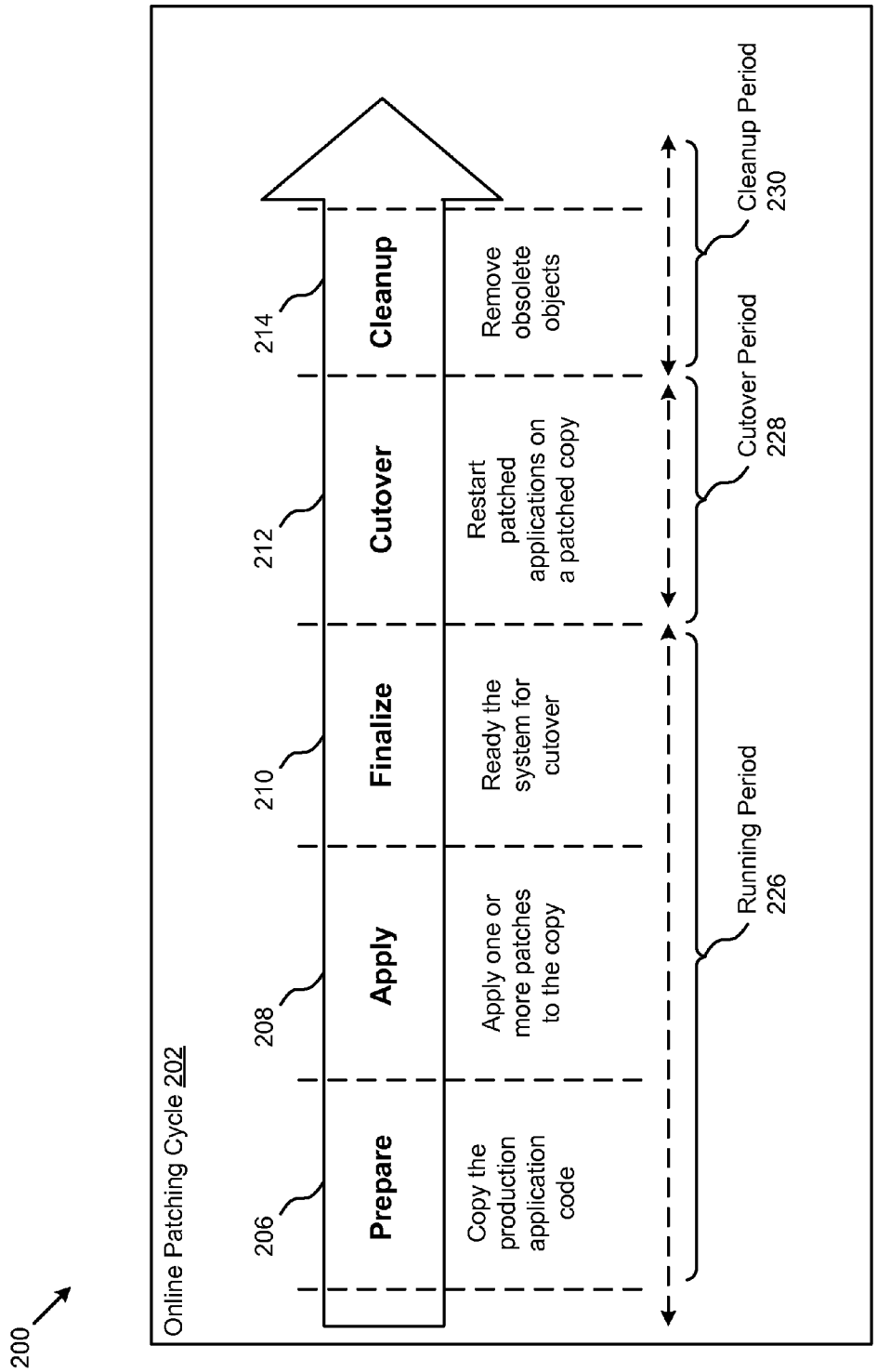
FIG. 2 depicts an online patching cycle in which are performed operations for synchronizing between middleware configurations and application configurations, according to some embodiments.

FIG. 2 depicts an online patching cycle 200 in which are performed operations for synchronizing between middleware configurations and application configurations during an installation-wide upgrade. As an option, the present online patching cycle 200 may be implemented in the context of the architecture and functionality of the embodiments described herein. Also, the online patching cycle 200 or any aspect therein may be implemented in any desired environment.

To apply an online patch to an active/online installation, the installation is promoted through a series of sequential phases known as an online patching cycle. The shown online patching cycle 202 is given as:

PREPARE a patch edition (see online patch cycle prepare step 206).
APPLY a patch or patches to a patch edition (see online patch cycle apply step 208).
FINALIZE to get the system ready for cutover (see online patch cycle finalize step 210).
CUTOVER to patch edition (see online patch cycle cutover step 212).
  Shutdown software applications and application services.
  Set a patch edition as the new run edition.
  Re-start software applications and middleware application services.
CLEANUP old objects or editions (see online patch cycle cleanup step 214).

As described in the above cycle, creating and patching relies on many specialized techniques to maintain a run edition (e.g., see FIG. 3 initial run edition 306) and one or more patch editions (e.g., see FIG. 3 patch edition 320) in the presence of continuously changing customer data in database tables. The concept and implementation of "edition-based redefinition" creates patch edition copies of application software (e.g., application code modules) and respective data in order to continuously apply patch transformations to runtime data that changes while the patch is executing.

Continuing with the description of the online patching cycle 202, users of the installation can be all online users during the normal operation (e.g., during the running period 226), then for the brief period of the cutover (e.g., during the cutover period 228) the users are offline, to return online (e.g., in cleanup period 230) shortly after conclusion of the period of the cutover.

One embodiment supports full installation online patching. Some installations comprise many products (e.g., hundreds of software applications, thousands of software application configurations, and many tens of thousands of tables). Implementing the above cycle to manage edition components for minimizing downtime during upgrades relies in part on a particular configuration of an edition. An approach to forming such a particular configuration of an edition is discussed below.

Figure 3:
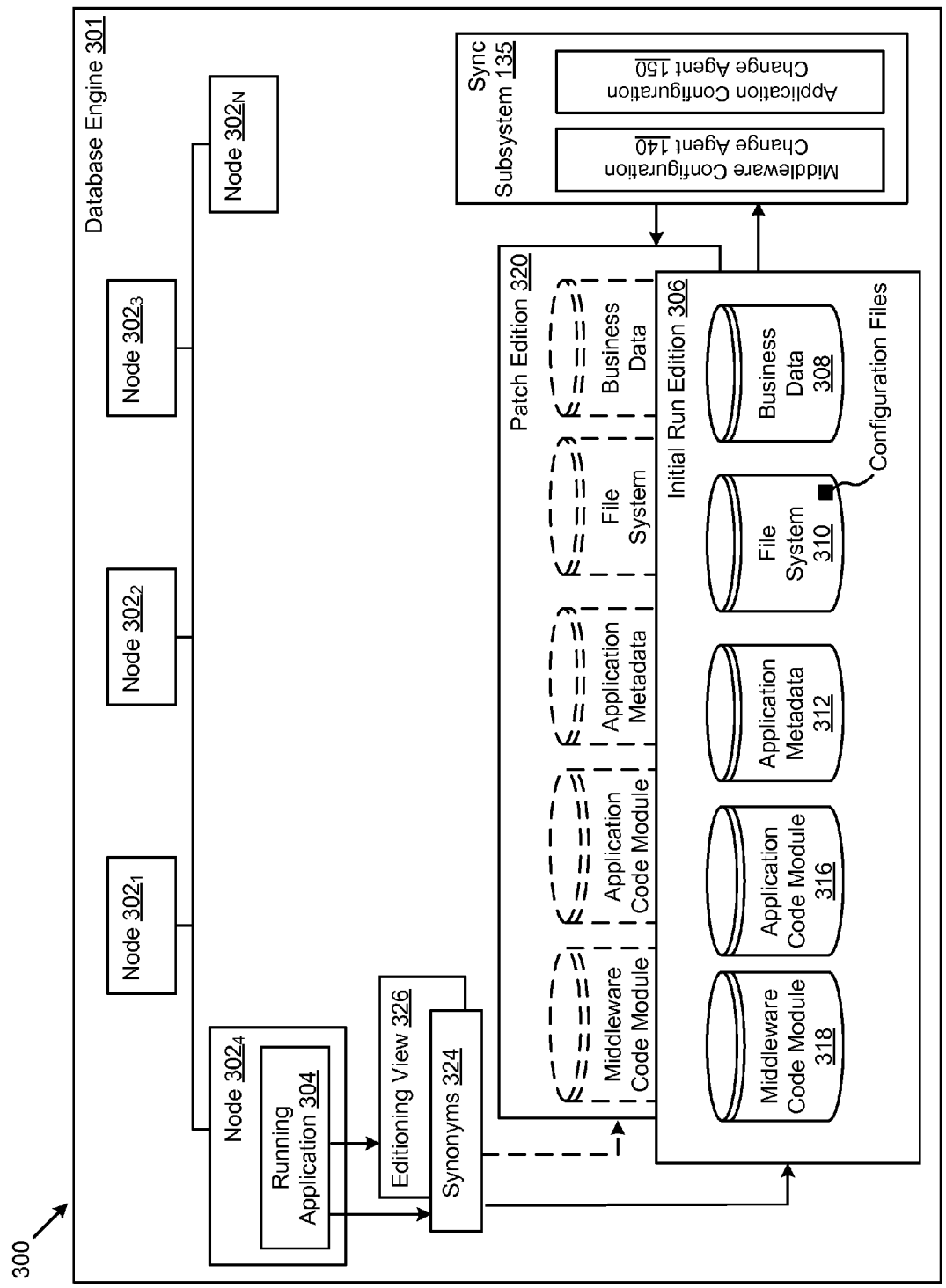
FIG. 3 depicts an example installation during performance of operations for synchronizing between middleware configurations and application configurations in an online patching cycle, according to some embodiments.

FIG. 3 depicts an example installation 300 during performance of operations for synchronizing between middleware configurations and application configurations in an online patching cycle As shown, the installation comprises a database engine 301 which in turn comprises computing nodes (e.g., node $302_1$, node $302_2$, node $302_3$, node $302_4$, node $302_N$, etc.) any of which computing nodes can communicate with any other of the computing nodes. Instances of application software (e.g., instances of running application 304) execute on computing nodes and accesses stored data (e.g., business data 308, one or more instances of a file system 310, etc.). A software application can also access configuration data as stored in various embodiments, (e.g., application metadata 312, application code modules 316, and application schema 318).

The application code modules 316 serves to store one or more copies of the software application, while the application metadata 312 serves to store configuration state data (e.g., disjoint from the business data 308). The application metadata 312 can comprise application-specific configuration state data which can be used by the application to facilitate communication with middleware.

A particular collection of interrelated components in a database system (e.g., application metadata 312, application code modules 316, application schema 318, business data 308, one or more instances of a file system 310, etc.) can be amalgamated into an "edition" (e.g., an initial run edition 306), which edition can then be subjected to transformations (e.g., synchronizations, data copies, data references, data conversions, etc.) into one or more other editions (e.g., patch edition 320), as shown.

In order to facilitate for minimizing downtime during upgrades of interrelated components in a database system, the collection of interrelated components are handled using the techniques disclosed herein. Strictly as an introductory example, an instance of a running application can access an initial run edition, or an instance of a running application can access a patch edition. Various techniques for managing the timing and type of access are provided for by the editioning view 326 and by use of synonyms 324.

As can be recognized by those skilled in the art, a first instance of a running application can access and make changes to an initial run edition. Such changes can be detected and propagated to a patch edition using cross-edition triggers. In this manner a second instance of the running application can access the changes so propagated to the patch edition.

Components of a running installation can separated into a taxonomy as follows:
  A platform (e.g., storage hardware and software, servers, network components, OS, database hardware and software, middleware hardware and software, system management hardware and software, etc.), and
  One or more software applications (e.g., application code modules, application schema, code, application metadata, etc.).
  Physical storage serves to persist actual stored files and database tables, whereas a view of the physical storage, namely logical storage 180 is a view of the relevant parts of the physical storage.

The techniques described herein provide for online patching of applications (and respective application data) as well as for the online patching and online transformation of business data (e.g., transformation to an updated application schema). Implementing an upgrade of an installation using the above online patching cycle relies in part on the sync subsystem 135 and a transformation process. A state change transformation engine 160 facilitates the transformation process. Changes to certain middleware configurations (e.g., secure communication middleware configurations, load balancing middleware configurations) can set off an avalanche configuration changes, and can potentially affect a large number of configuration elements belonging to both middleware and applications. For example, an attempt to enforce system-wide secure communication would introduce browser changes, which in turn would introduce or require web server changes, and so on. Managing such an avalanche effect can be facilitated by the aforementioned state change transformation engine.

Again referring to FIG. 1, a user might interact with an online patch user interface 119, and might use such a user interface to initiate an online patching cycle (e.g., see online patch cycle initiation module 162), which in turn might invoke operations in an online patch cycle prepare module 164. The online patch cycle prepare module 164 can perform steps to generate initial forms of the patch edition 320. During various periods within the online patching cycle, certain portions of the patch edition 320 may need to be configured. Specifically, the state change transformation engine 160 can access any of the middleware state variables 116 as well as application-specific state variables $118_1$ and apply one or more transformations to the accessed configuration state variables. In the context of an upgrade of an installation, many individual and/or many groups of configuration state variables may be upgraded/changed during the online patching cycle. During the online patching cycle a set of middleware configuration state variables might be subjected to a transformation (e.g., see transformed set 114). For example, a transformed set 114 might comprise a set of port numbers to be used in the patch edition (but not to be used in the run edition). As another example, during a patch cycle, specifically at a cutover time, each of the file systems change which database edition they refer to. In this scenario, a previous patch edition of a database is promoted to become a run edition, and become accessible via the default connection to the run database. In some cases a source of truth (e.g., truth file 181, truth table 182) might be used by the state change transformation engine 160 in order to distinguish between a user configuration setting and a configuration setting or set of configuration settings used in accomplishing the online patching cycle.

Figure 4:
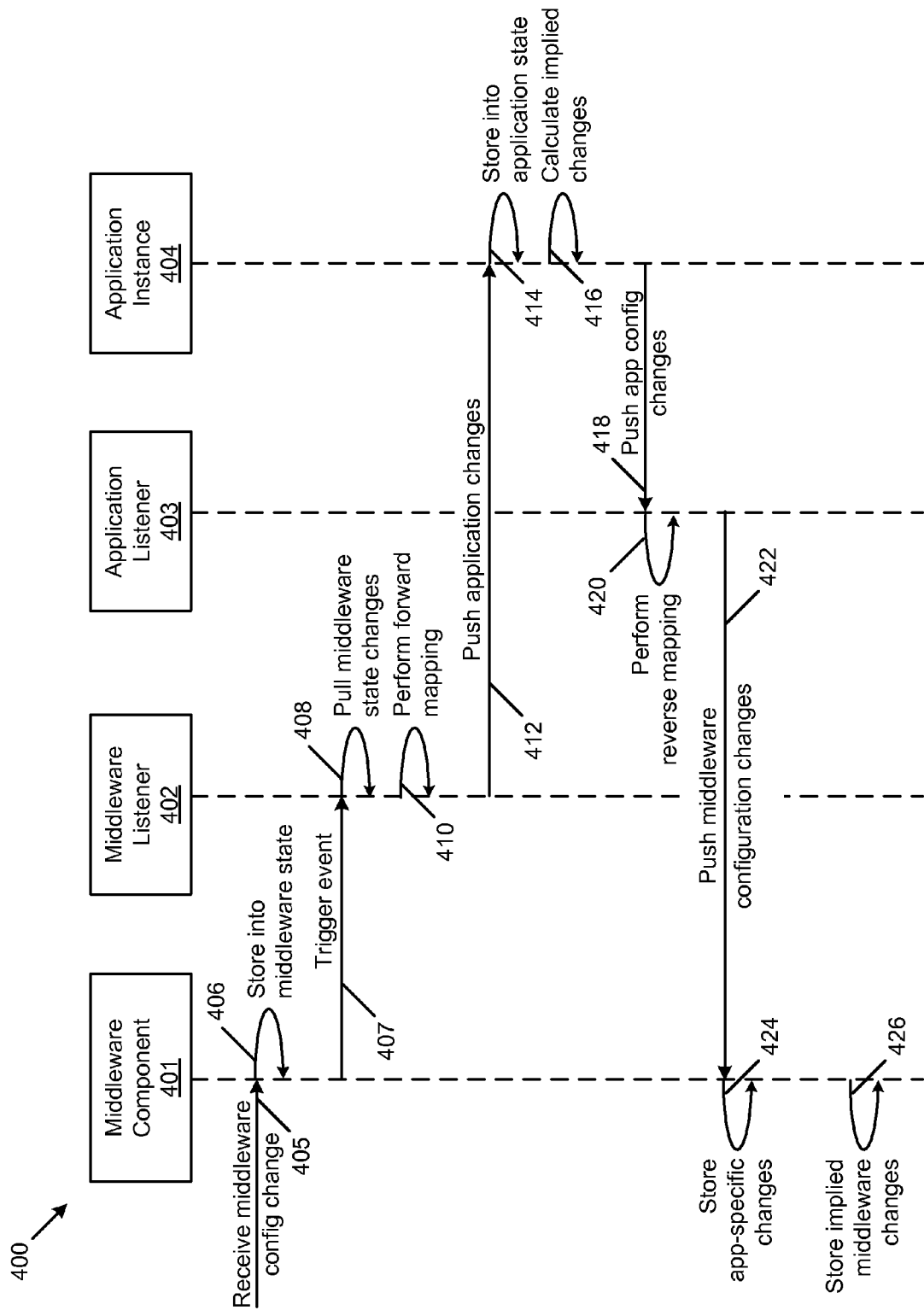
FIG. 4 is a sequence chart of a protocol for synchronizing between middleware configurations and application configurations, according to some embodiments.

FIG. 4 is a sequence chart of a protocol 400 for synchronizing between middleware configurations and application configurations. As an option, the present protocol 400 may be implemented in the context of the architecture and functionality of the embodiments described herein. Also, the protocol 400 or any aspect therein may be implemented in any desired environment.

As shown, the protocol 400 involves a middleware component 401 (e.g., middleware module 106), a middleware listener 402 (e.g., middleware configuration change agent 140), an application listener 403 (e.g., an application configuration change agent 150), and an application instance 404 (e.g., application software 130).

The protocol shown commences upon receipt of a middleware configuration change (see message 405), which middleware configuration change is stored into a middleware state storage area (see operation 406). In some cases the middleware configuration change is deemed as sufficient to trigger the middleware listener, and the middleware listener is triggered using a trigger event (see event 407). The middleware listener in turn pulls middleware configuration states (see operation 408) and commences to perform a forward mapping (see operation 410). In some cases, the forward mapping of operation 410 deems that one or more applications that rely on the middleware component 401 for services should be notified of the middleware configuration change, and pushes the forward-mapped application configuration changes (see message 412) to an application instance 404.

The application instance 404 receives the forward-mapped application configuration changes and stores the configuration changes (see operation 414) to a location accessible by the application instance (e.g., using a configuration settings manager). In some cases one configuration state change would imply another configuration state change (see operation 416), and so on until all state variable dependencies are resolved. In the event that a first configuration state change would imply another configuration state change, it might also be the case that the middleware module should be notified of the application-specific change(s) so that the middleware module can store the application-specific change(s) as needed, such as in a storage location holding the application-specific state variables $118_2$ (see operation 414). In such a case, the application instance might initiate messaging to push configuration changes (see message 418), and the initial push might be to the application listener 403, which can then perform reverse mapping (see operation 420) in order to identify if there are any middleware changes that are responsive to the application configuration changes (again, see message 412). If so, then application listener 403 sends a message to push middleware configuration changes (see message 422), which are then stored in an area comprising instances of application-specific state variables (see operation 424). Also, when the application listener 403 sends a message (see message 422) to push middleware configuration changes (e.g., see reverse push path 121), such a message might also include implied middleware state changes which are then stored in an area comprising instances of middleware state variables 116 (see operation 426).

Figure 5:
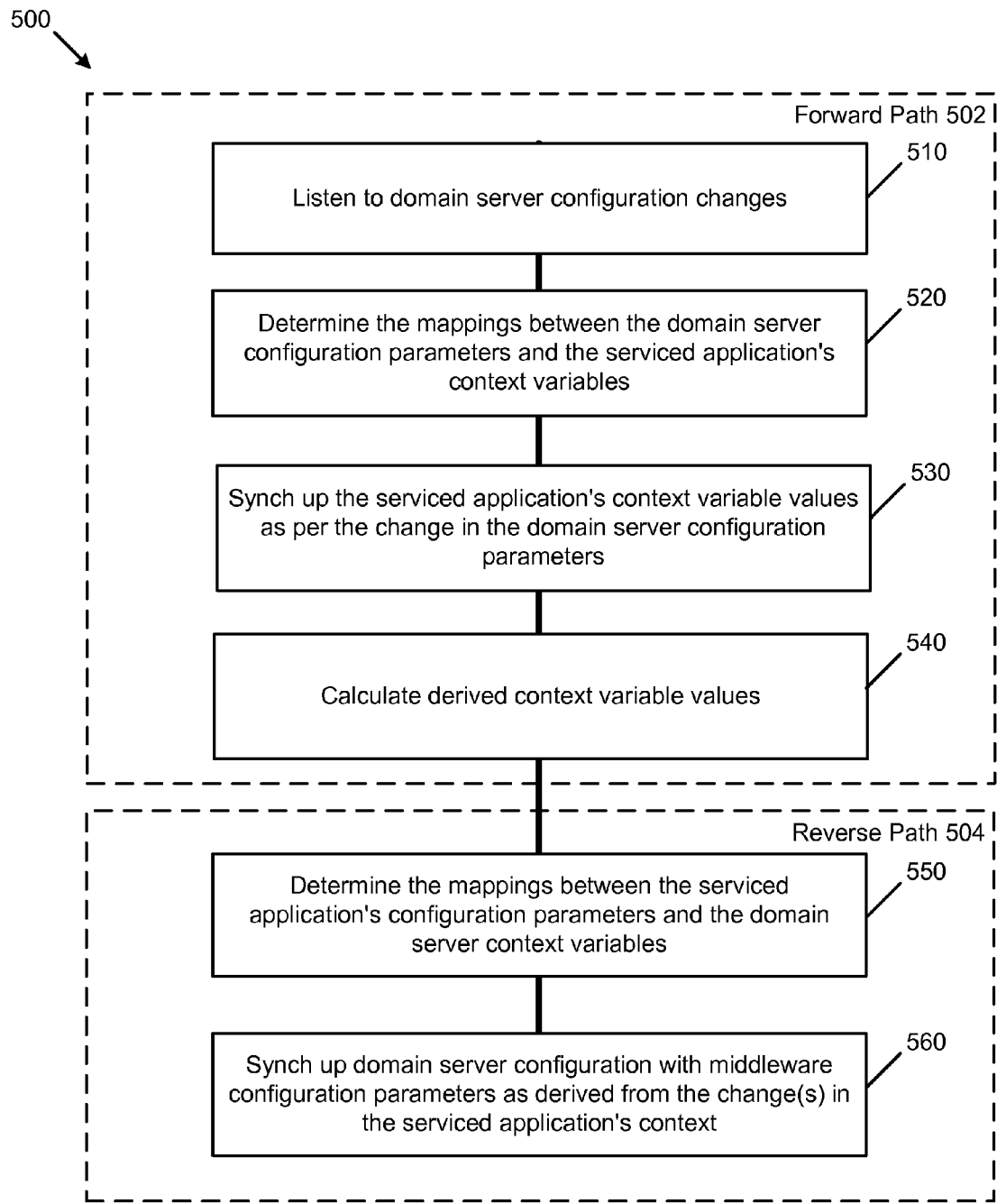
FIG. 5 is a flow chart of operations depicting a domain server middleware module participating during the course of synchronizing between middleware configurations and application configurations, according to some embodiments.

FIG. 5 is a flow chart of operations 500 depicting domain server middleware participation during the course of synchronizing between middleware configurations and application configurations. As an option, the present operations 500 may be implemented in the context of the architecture and functionality of the embodiments described herein. Also, the operations 500 or any aspect therein may be implemented in any desired environment.

As shown, the operation 510 listens for domain server configuration changes, and then determines the mappings between the domain server configuration parameters and the serviced application's context variables (see operation 520). Assuming there is at least one application context variable to be changed responsive to the domain server configuration change, then synch up the serviced application's context variable to be consistent with the change in the domain server configuration (see operation 530). For example, if the domain server configuration change were to change the encryption method to use 256-bit encryption keys (e.g., rather than 128-bit encryption keys), then the application might need to know to reserve enough storage for such keys. Continuing, it is possible that a particular context variable value might be used in the calculation of derived context variable values, and operation 540 serves to resolve these other context variable values. The foregoing operations (e.g., operation 510 through operation 540) are labeled as a forward path 502, and in one embodiment the forward path corresponds to traversals in FIG. 1 including notification trigger 125, pull path 122, middleware configuration change agent 140, and forward push path 123.

Of course it is possible that a change in any particular context variable value might be mapped from a change in the domain server's configuration (e.g., middleware state). If so, operation 550 serves to determine the mappings between the serviced application's configuration parameters and the domain server's context variables; then synch up domain server configuration with middleware configuration parameters as derived from the change(s) in the serviced application's context (see operation 560). The foregoing operations (e.g., operation 550 through operation 560) are labeled as a reverse path 504, and in one embodiment the reverse path corresponds to paths in FIG. 1 including application push path 124, application configuration change agent 150, and reverse push path 121. Also, in various configurations, including configurations shown and described herein, a change to the configuration of an application component can trigger operations within a sync subsystem 135. In some situations a notification signal (e.g., using trigger 126) is raised.

Figure 6:
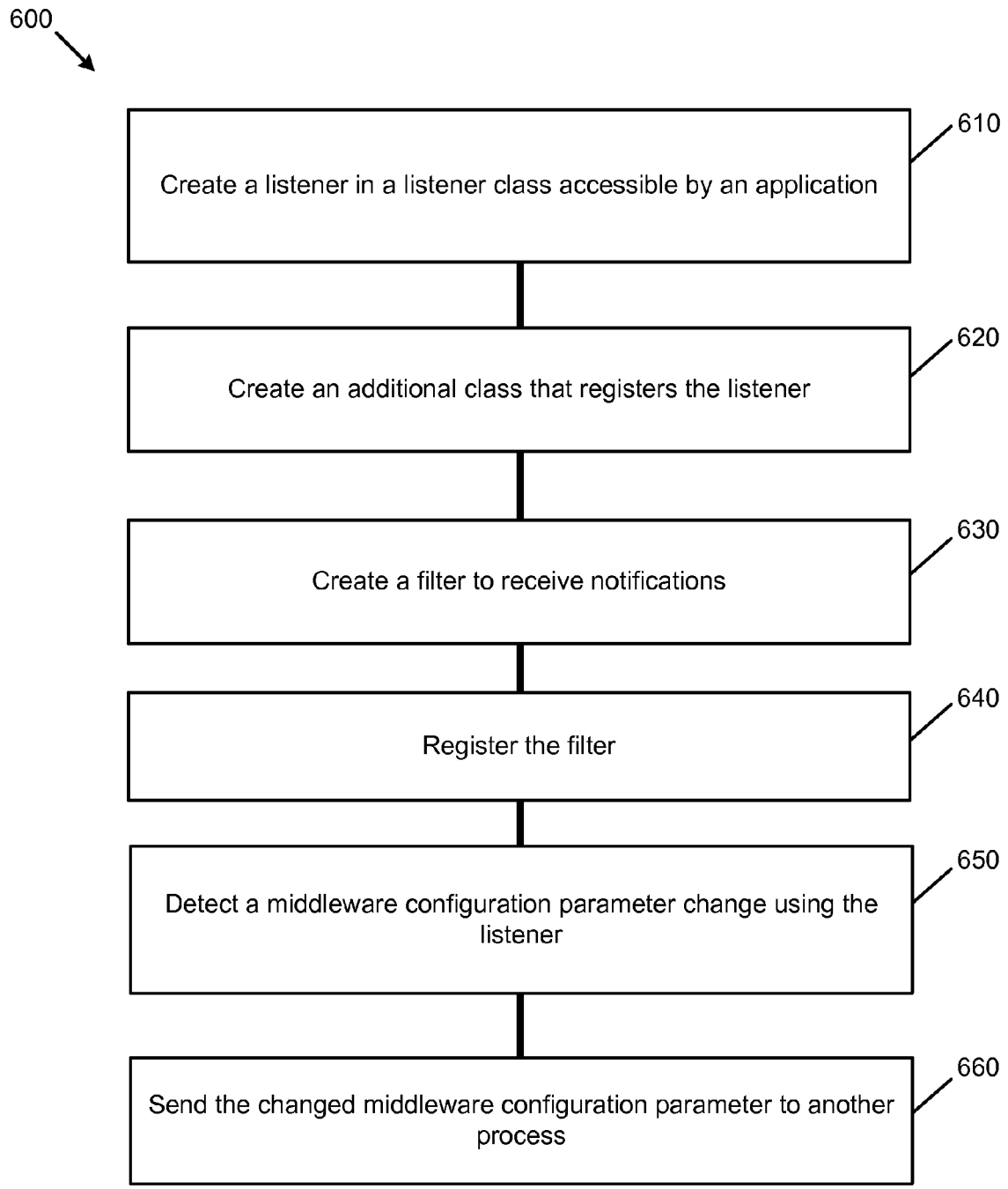
FIG. 6 is a flow chart of operations to create inter-process communication paths for synchronizing between middleware configurations and application configurations, according to some embodiments.

FIG. 6 is a flow chart of operations 600 to create interprocess communication paths for synchronizing between middleware configurations and application configurations. As an option, the present operations 600 may be implemented in the context of the architecture and functionality of the embodiments described herein. Also, the operations 600 or any aspect therein may be implemented in any desired environment.

Listening for Configuration State Changes

One implementation uses MBEAN notifications. Such an MBEAN-based notification technique can be implemented by following the below steps:

Create a listener class in the application (see operation 610). As is known-in-the-art, MBEANs can emit notifications when specific events occur, such as a change in a variable value. To receive such notifications, a listener class is created.

Create an additional class that registers the listener (see operation 620).

Create a filter with the MBEAN notifications to be received (see operation 630).

Register the filter (see operation 640).

Sending Configuration State Changes

Upon receipt (e.g., by a listener) of a configuration state change (see operation 650) one implementation sends the configuration state change (and/or derived configuration state changes) to another process (e.g., to an application instance 404, and/or to a configuration settings manager (see operation 660).

Additional Embodiments of the Disclosure

Figure 7:
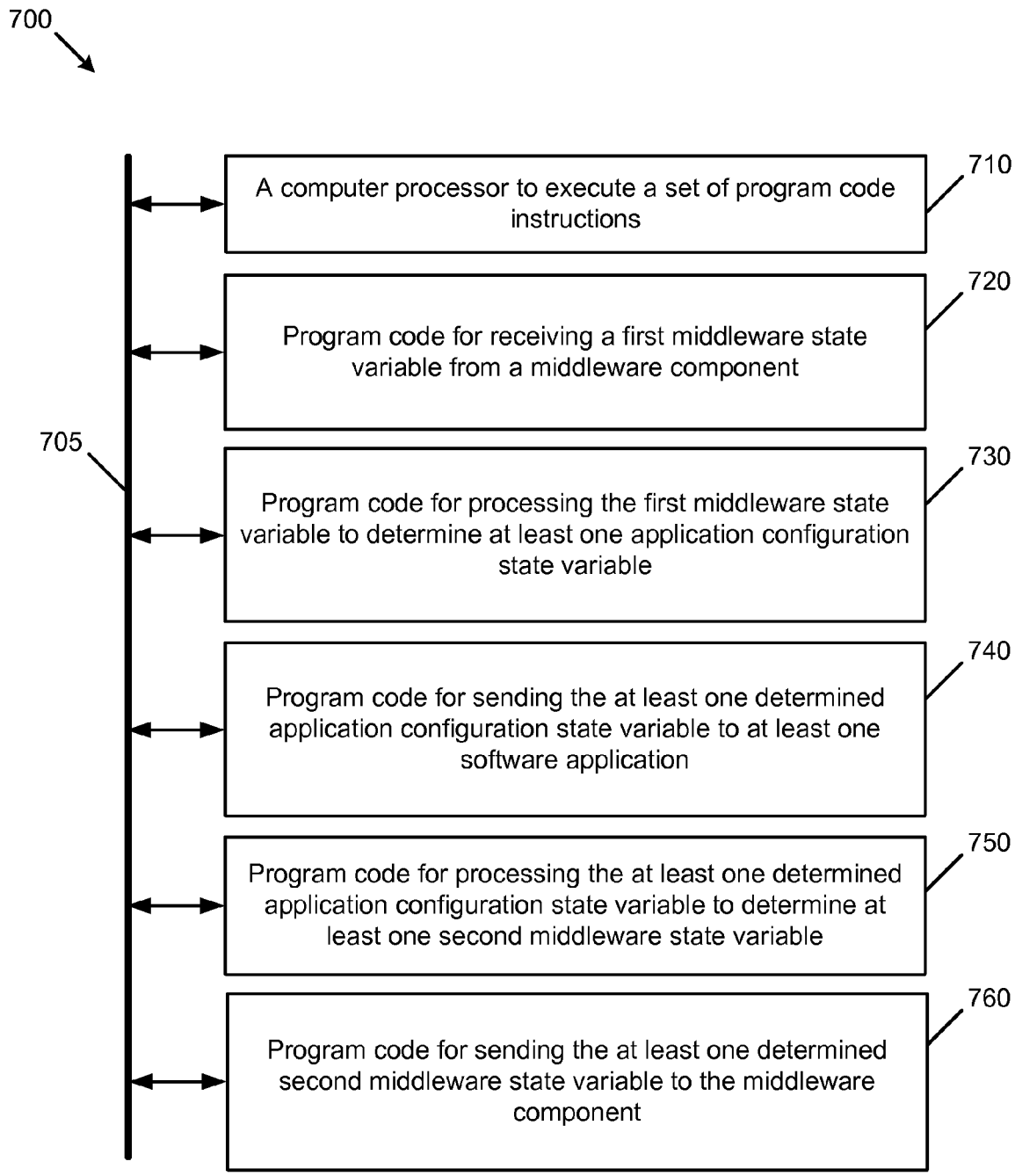
FIG. 7 depicts a system synchronizing for between middleware configurations and application configurations, according to some embodiments.

FIG. 7 depicts a system for synchronizing between middleware configurations and application configurations. As an option, the present system 700 may be implemented in the context of the architecture and functionality of the embodiments described herein. Of course, however, the system 700 or any operation therein may be carried out in any desired environment. As shown, system 700 comprises at least one processor and at least one memory, the memory serving to store program instructions corresponding to the operations of the system. As shown, an operation can be implemented in whole or in part using program instructions accessible by a module. The modules are connected to a communication path 705, and any operation can communicate with other operations over communication path 705. The modules of the system can, individually or in combination, perform method operations within system 700. Any operations performed within system 700 may be performed in any order unless as may be specified in the claims. The embodiment of FIG. 7 implements a portion of a computer system, shown as system 700, comprising a computer processor to execute a set of program code instructions (see module 710) and modules for accessing memory to hold program code instructions to perform: receiving a first middleware state variable from a middleware component (see module 720); processing the first middleware state variable to determine at least one application configuration state variable (see module 730); sending the at least one determined application configuration state variable to at least one software application (see module 740); processing the at least one determined application configuration state variable to determine at least one second middleware state variable (see module 750); and sending the at least one determined second middleware state variable to the middleware component (see module 760).

In various embodiments, the determination of the application configuration state variable uses a forward mapper, and in some cases, the determination of the middleware state variables use a reverse mapper. The system 700 can be used in the context of an online patch cycle, and the system 700 can further be used to initiate an online patch cycle during which online patch cycle various operations might invoke a transformation process to process state variable transformations between a run edition and a patch edition.

Figure 8:
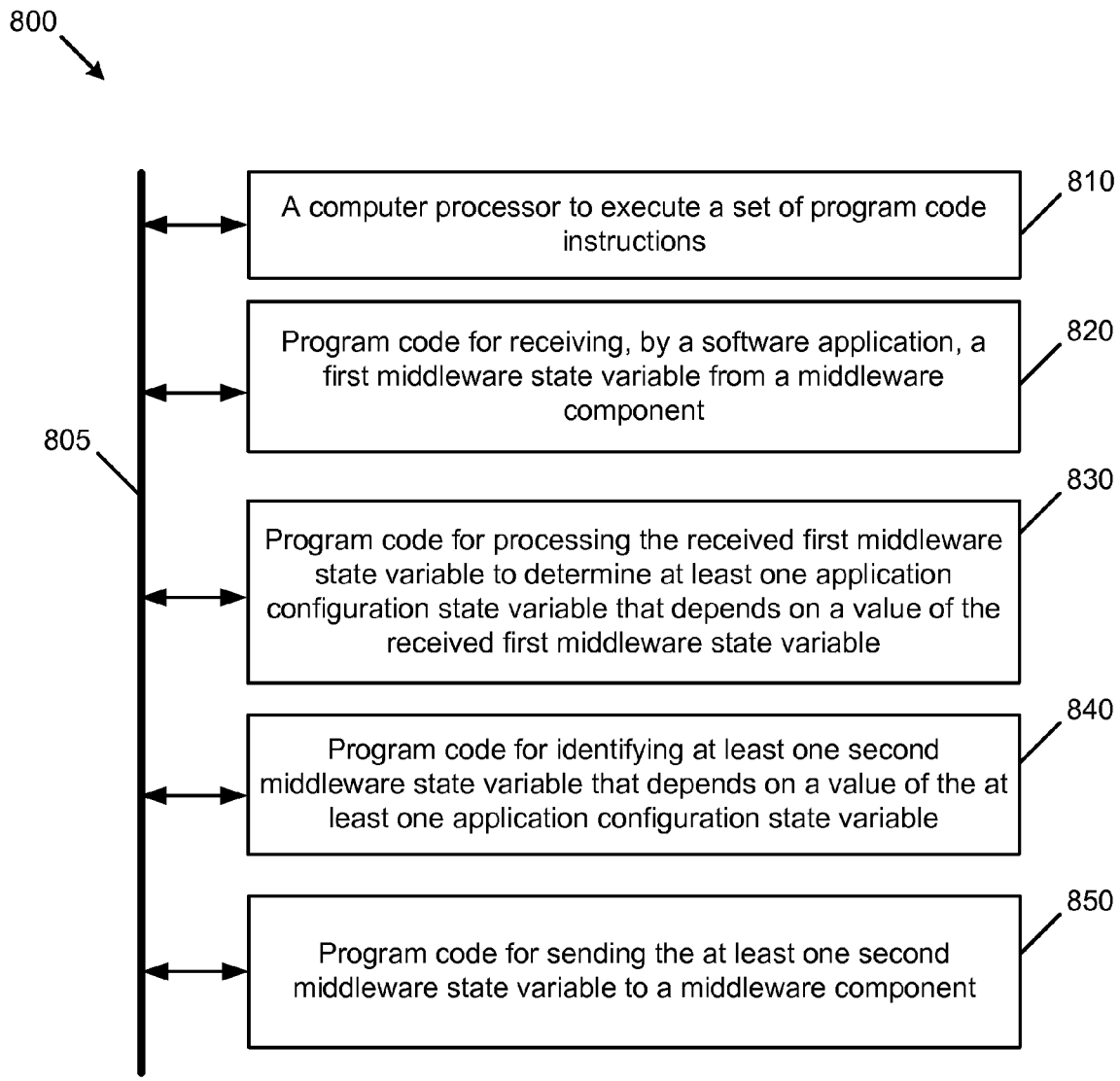
FIG. 8 is a system for synchronizing between middleware configurations and application configurations, according to some embodiments.

FIG. 8 depicts a system for synchronizing between middleware configurations and application configurations. As an option, the present system 800 may be implemented in the context of the architecture and functionality of the embodiments described herein. Of course, however, the system 800 or any operation therein may be carried out in any desired environment. As shown, system 800 comprises at least one processor and at least one memory, the memory serving to store program instructions corresponding to the operations of the system. As shown, an operation can be implemented in whole or in part using program instructions accessible by a module. The modules are connected to a communication path 805, and any operation can communicate with other operations over communication path 805. The modules of the system can, individually or in combination, perform method operations within system 800. Any operations performed within system 800 may be performed in any order unless as may be specified in the claims. The embodiment of FIG. 8 implements a portion of a computer system, shown as system 800, comprising a computer processor to execute a set of program code instructions (see module 810) and modules for accessing memory to hold program code instructions to perform: receiving, by a software application, a first middleware state variable from a middleware component (see module 820); processing the received first middleware state variable to determine at least one application configuration state variable that depends on a value of the received first middleware state variable (see module 830); identifying at least one second middleware state variable that depends on a value of the at least one application configuration state variable (see module 840); sending the at least one second middleware state variable to a middleware component (see module 850).

System Architecture Overview

Figure 9:
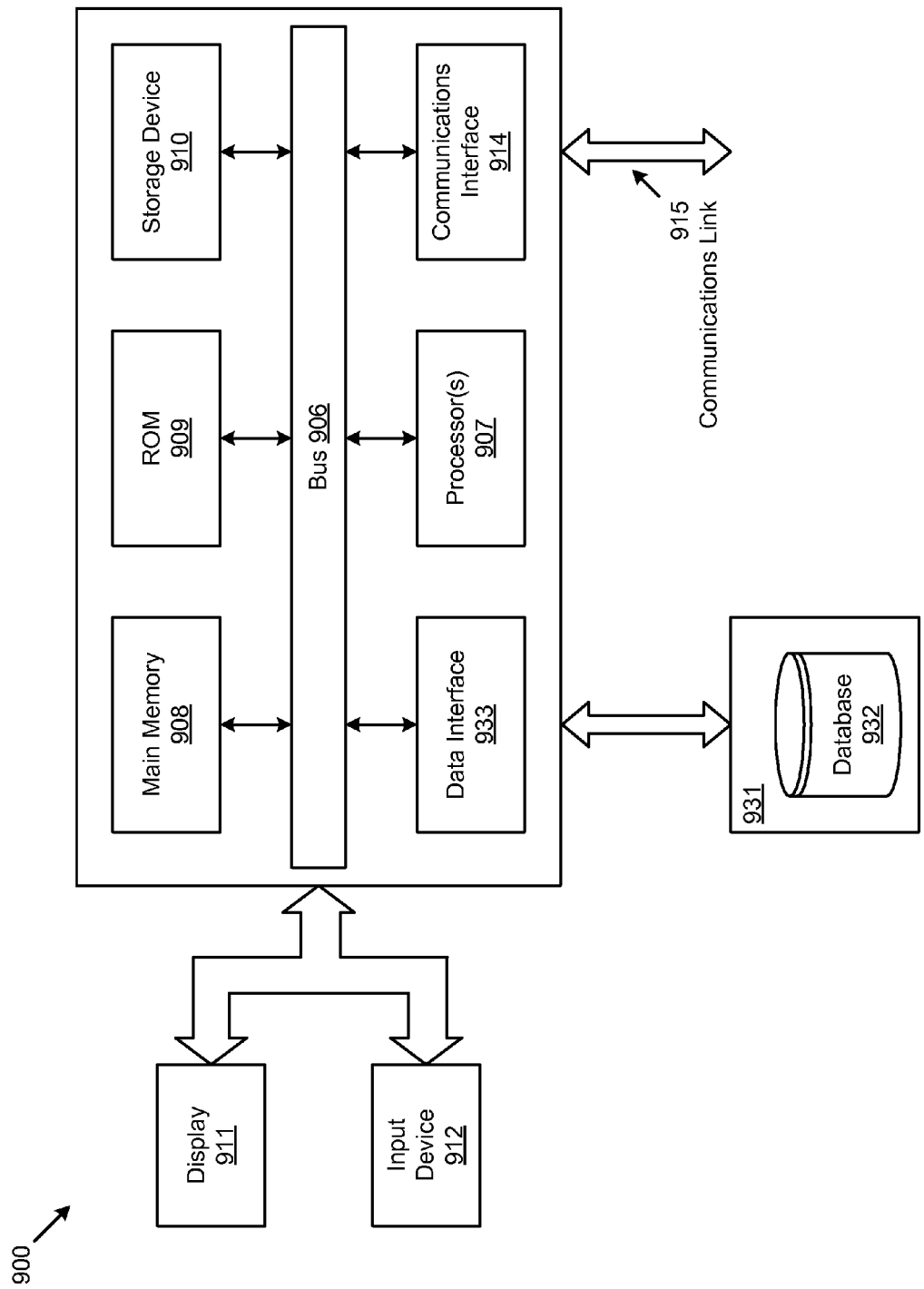
FIG. 9 depicts a block diagram of an instance of a computer system suitable for implementing an embodiment of the present disclosure.

FIG. 9 depicts a block diagram of an instance of a computer system 900 suitable for implementing an embodiment of the present disclosure. Computer system 900 includes a bus 906 or other communication mechanism for communicating information, which interconnects subsystems and devices, such as a processor 907, a system memory 908 (e.g., RAM), a static storage device (e.g., ROM 909), a disk drive 910 (e.g., magnetic or optical), a data interface 933, a communication interface 914 (e.g., modem or Ethernet card), a display 911 (e.g., CRT or LCD), input devices 912 (e.g., keyboard, cursor control), and an external data repository 931.

According to one embodiment of the disclosure, computer system 900 performs specific operations by processor 907 executing one or more sequences of one or more instructions contained in system memory 908. Such instructions may be read into system memory 908 from another computer readable/usable medium, such as a static storage device or a disk drive 910. In alternative embodiments, hard-wired circuitry may be used in place of or in combination with software instructions to implement the disclosure. Thus, embodiments of the disclosure are not limited to any specific combination of hardware circuitry and/or software. In one embodiment, the term "logic" shall mean any combination of software or hardware that is used to implement all or part of the disclosure.

The term "computer readable medium" or "computer usable medium" as used herein refers to any medium that participates in providing instructions to processor 907 for execution. Such a medium may take many forms, including but not limited to, non-volatile media and volatile media. Non-volatile media includes, for example, optical or magnetic disks, such as disk drive 910. Volatile media includes dynamic memory, such as system memory 908.

Common forms of computer readable media includes, for example, floppy disk, flexible disk, hard disk, magnetic tape, or any other magnetic medium; CD-ROM or any other optical medium; punch cards, paper tape, or any other physical medium with patterns of holes; RAM, PROM, EPROM, FLASH-EPROM, or any other memory chip or cartridge, or any other non-transitory medium from which a computer can read data.

In an embodiment of the disclosure, execution of the sequences of instructions to practice the disclosure is performed by a single instance of the computer system 900. According to certain embodiments of the disclosure, two or more computer systems 900 coupled by a communications link 915 (e.g., LAN, PTSN, or wireless network) may perform the sequence of instructions required to practice the disclosure in coordination with one another.

Computer system 900 may transmit and receive messages, data, and instructions, including programs (e.g., application code), through communications link 915 and communication interface 914. Received program code may be executed by processor 907 as it is received, and/or stored in disk drive 910 or other non-volatile storage for later execution. Computer system 900 may communicate through a data interface 933 to a database 932 on an external data repository 931. A module as used herein can be implemented using any mix of any portions of the system memory 908, and any extent of hard-wired circuitry including hard-wired circuitry embodied as a processor 907.

In the foregoing specification, the disclosure has been described with reference to specific embodiments thereof. It will, however, be evident that various modifications and changes may be made thereto without departing from the broader spirit and scope of the disclosure. For example, the above-described process flows are described with reference to a particular ordering of process actions. However, the ordering of many of the described process actions may be changed without affecting the scope or operation of the disclosure. The specification and drawings are, accordingly, to be regarded in an illustrative sense rather than restrictive sense.

What is claimed is:

1. A computer implemented method for synchronizing between middleware configurations and application configurations, the method comprising:

receiving a first middleware state variable from a middleware component;

processing, at a synchronization module at least stored in memory, the first middleware state variable to determine at least one application state variable that depends on a value of the first middleware state variable and corresponds to an online edition of at least one software application that relies upon the middleware component;

sending one or more changes corresponding to the at least one application state variable to an offline edition of the at least one software application;

determining whether the one or more changes in the at least one application state variable result in one or more other changes in the middleware component;

receiving a change in configurations of the middleware component;

storing the change or information thereof into the first middleware state variable of the middleware component at a first location of the memory of a computing system;

triggering one or more operations within the synchronization module;

obtaining, at a middleware listener module, the one or more changes corresponding to the change or information thereof of and including at least a topology change in the middleware component;

storing the one or more changes at a second location of the memory of the computer system;

determining, at a forward mapping module, whether or not the at least one software application is to receive the one or more changes;

determining, at the forward mapping module, whether or not the one or more changes are affected by the change or information thereof of the middleware component;

transmitting the one or more changes to the offline edition of the at least one software application at least by performing a forward mapping operation with the forward mapping module when the at least one software application is to receive the one or more changes;

applying the one or more changes to the offline edition of the at least one software application;

determining, at a reverse mapping module, one or more implied changes corresponding to the one or more changes to the offline edition of the at least one software application and storing the one or more implied changes as the one or more other changes at a third location of the memory;

transmitting the one or more other changes to an application listener module for the middleware component;

performing a reverse mapping for the one or more other changes for the middleware component into one or more middleware configuration changes;

storing the one or more middleware configuration changes at a fourth location of the memory;

transmitting the one or more middleware configuration changes to the middleware component;

preparing the offline edition of the at least one software application at least by applying the one or more middleware configuration changes to the middleware component;

creating runtime data, which change while the offline edition and the one or more middleware configuration changes are being applied, for the online edition of the at least one software application and storing the runtime data at a fifth location of the memory;

applying patch transformations to the runtime data stored at the fifth location of the memory;

shutting down the online edition of the at least one software application;

designating the offline edition of the at least one software application as a new online edition of the at least one software application; and restarting the new online edition of the at least one software application.

2. The method of claim 1, wherein the determination of the at least one application state variable uses a forward mapper.

3. The method of claim 1, further comprising determining at least one second middleware state variable.

4. The method of claim 1, further comprising initiating an online patch cycle.

5. The method of claim 1, further comprising invoking a transformation process to process state variable transformations.

6. The method of claim 1, wherein receiving the first middleware state variable from the middleware component comprises receiving a notification trigger.

7. A computer system for synchronizing between middleware configurations and application configurations, comprising:
- a computer processor to execute a set of program code instructions; and
- a memory to hold the program code instructions, in which the program code instructions comprises program code which, when executed by the computer processor, causes the computer processor to:
- receive a first middleware state variable from a middleware component;
- process, at a synchronization module at least stored in memory, the first middleware state variable to determine at least one application state variable that depends on a value of the first middleware state variable and corresponds to an online edition of at least one software application that relies upon the middleware component;
- send one or more changes corresponding to the at least one application state variable to an offline edition of the at least one software application;
- determine whether the one or more changes in the at least one application state variable result in one or more other changes in the middleware component;
- receive a change in configurations of the middleware component;
- store the change or information thereof into the first middleware state variable of the middleware component at a first location of the memory of a computing system;
- trigger one or more operations within the synchronization module;
- obtain, at a middleware listener module, the one or more changes corresponding to the change or information thereof of and including at least a topology change in the middleware component;
- store the one or more changes at a second location of the memory of the computer system;
- determine, at a forward mapping module, whether or not the at least one software application is to receive the one or more changes;
- determine, at the forward mapping module, whether or not the one or more changes are affected by the change or information thereof of the middleware component;
- transmit the one or more changes to the offline edition of the at least one software application at least by performing a forward mapping operation with the forward mapping module when the at least one software application is to receive the one or more changes;
- apply the one or more changes to the offline edition of the at least one software application;
- determine, at a reverse mapping module, one or more implied changes corresponding to the one or more changes to the offline edition of the at least one software application and storing the one or more implied changes as the one or more other changes at a third location of the memory;
- transmit the one or more other changes to an application listener module for the middleware component;
- perform a reverse mapping for the one or more other changes for the middleware component into one or more middleware configuration changes;
- store the one or more middleware configuration changes at a fourth location of the memory;
- transmit the one or more middleware configuration changes to the middleware component;
- prepare the offline edition of the at least one software application at least by applying the one or more middleware configuration changes to the middleware component;
- create runtime data, which change while the offline edition and the one or more middleware configuration changes are being applied, for the online edition of the at least one software application and storing the runtime data at a fifth location of the memory;
- apply patch transformations to the runtime data stored at the fifth location of the memory;
- shut down the online edition of the at least one software application;
- designate the offline edition of the at least one software application as a new online edition of the at least one software application; and
- restart the new online edition of the at least one software application.

8. The computer system of claim 7, wherein a determination of the at least one application state variable uses a forward mapper.

9. The computer system of claim 7, the program code instructions comprising the program code which, when executed by the computer processor, further causes the computer processor to determine at least one second middleware state variable.

10. The computer system of claim 7, the program code instructions comprising the program code which, when executed by the computer processor, further causes the computer processor to initiate an online patch cycle.

11. The computer system of claim 7, the program code instructions comprising the program code which, when executed by the computer processor, further causes the computer processor to invoke a transformation process to process state variable transformations.

12. The computer system of claim 7, wherein the program code instructions comprising the program code which, when executed by the computer processor, further causes the computer processor to receive the first middleware state variable from the middleware component further comprises the program code which, when executed by the computer processor, causes the computer processor to receive a notification trigger.

13. The computer system of claim 7, wherein the program code instructions comprising the program code which, when executed by the computer processor, further causes the computer processor to receive the first middleware state variable from the middleware component further comprises the program code which, when executed by the computer processor, causes the computer processor to execute a pull operation.

14. A computer program product embodied in a non-transitory computer readable medium, the non-transitory computer readable medium having stored thereon a sequence of instructions which, when executed by a processor causes the processor to execute a set of acts to implement synchronizing between middleware configurations and application configurations, the set of acts comprising:
- receiving a first middleware state variable from a middleware component;
- processing, at a synchronization module at least stored in memory, the first middleware state variable to determine at least one application state variable that depends on a value of the first middleware state variable and corresponds to an online edition of at least one software application that relies upon the middleware component;

sending one or more changes corresponding to the at least one application state variable to an offline edition of the at least one software application;

determining whether the one or more changes in the at least one application state variable result in one or more other changes in the middleware component;

receiving a change in configurations of the middleware component;

storing the change or information thereof into the first middleware state variable of the middleware component at a first location of the memory of a computing system;

triggering one or more operations within the synchronization module;

obtaining, at a middleware listener module, the one or more changes corresponding to the change or information thereof of and including at least a topology change in the middleware component;

storing the one or more changes at a second location of the memory of the computer system;

determining, at a forward mapping module, whether or not the at least one software application is to receive the one or more changes;

determining, at the forward mapping module, whether or not the one or more changes are affected by the change or information thereof of the middleware component;

transmitting the one or more changes to the offline edition of the at least one software application at least by performing a forward mapping operation with the forward mapping module when the at least one software application is to receive the one or more changes;

applying the one or more changes to the offline edition of the at least one software application;

determining, at a reverse mapping module, one or more implied changes corresponding to the one or more changes to the offline edition of the at least one software application and storing the one or more implied changes as the one or more other changes at a third location of the memory;

transmitting the one or more other changes to an application listener module for the middleware component;

performing a reverse mapping for the one or more other changes for the middleware component into one or more middleware configuration changes;

storing the one or more middleware configuration changes at a fourth location of the memory;

transmitting the one or more middleware configuration changes to the middleware component;

preparing the offline edition of the at least one software application at least by applying the one or more middleware configuration changes to the middleware component;

creating runtime data, which change while the offline edition and the one or more middleware configuration changes are being applied, for the online edition of the at least one software application and storing the runtime data at a fifth location of the memory;

applying patch transformations to the runtime data stored at the fifth location of the memory;

shutting down the online edition of the at least one software application;

designating the offline edition of the at least one software application as a new online edition of the at least one software application; and restarting the new online edition of the at least one software application.

15. The computer program product of claim 14, wherein a determination of the at least one application state variable uses a forward mapper.

16. The computer program product of claim 14, the sequence of instructions stored on the non-transitory computer readable medium further comprising instructions for determining at least one second middleware state variable.

17. The computer program product of claim 14, the sequence of instructions stored on the non-transitory computer readable medium further comprising initiating an online patch cycle.

18. The computer program product of claim 14, the sequence of instructions stored on the non-transitory computer readable medium further comprising invoking a transformation process to process state variable transformations.

19. The computer program product of claim 14, wherein receiving the first middleware state variable from the middleware component comprises receiving a notification trigger.

* * * * *